(12) United States Patent
Siegrist

(10) Patent No.: US 11,618,426 B2
(45) Date of Patent: Apr. 4, 2023

(54) MASTER BRAKE CYLINDER

(71) Applicant: Eric Siegrist, Georgian Bluffs (CA)

(72) Inventor: Eric Siegrist, Georgian Bluffs (CA)

( * ) Notice: Subject to any disclaimer, the term of this patent is extended or adjusted under 35 U.S.C. 154(b) by 0 days.

(21) Appl. No.: 16/857,480

(22) Filed: Apr. 24, 2020

(65) Prior Publication Data

US 2020/0339094 A1   Oct. 29, 2020

(30) Foreign Application Priority Data

Apr. 24, 2019   (CA) .................. CA 3040995

(51) Int. Cl.
| | |
|---|---|
| *B60T 17/08* | (2006.01) |
| *B60T 11/18* | (2006.01) |
| *B60T 7/04* | (2006.01) |
| *B60T 11/20* | (2006.01) |
| *B60T 7/06* | (2006.01) |

(52) U.S. Cl.
CPC .............. *B60T 17/088* (2013.01); *B60T 7/04* (2013.01); *B60T 7/06* (2013.01); *B60T 11/18* (2013.01); *B60T 11/203* (2013.01)

(58) Field of Classification Search
CPC ... B60T 7/04; B60T 7/06; B60T 11/18; B60T 11/20; B60T 11/203; B60T 11/22; B60T 17/088
USPC .................. 188/151 R, 152, 345; 60/588
See application file for complete search history.

(56) References Cited

U.S. PATENT DOCUMENTS

| | | | | | |
|---|---|---|---|---|---|
| 1,998,821 | A * | 4/1935 | Rockwell | ............... | B60T 11/22 60/588 |
| 2,577,153 | A * | 12/1951 | Pratt | .................... | B60T 11/165 60/585 |
| 2,759,329 | A * | 8/1956 | Ponti | ...................... | B60T 11/22 60/588 |
| 3,501,915 | A * | 3/1970 | Hackett | ................. | B60T 11/20 60/535 |
| 7,857,112 | B1* | 12/2010 | Tsai | ....................... | B62L 3/023 188/344 |
| 8,225,920 | B1* | 7/2012 | Fredrick | .................. | G05G 5/03 192/115 |
| 2020/0339094 | A1* | 10/2020 | Siegrist | ................ | B60T 17/088 |

* cited by examiner

*Primary Examiner* — Thomas J Williams
(74) *Attorney, Agent, or Firm* — Laurie Wright; Christopher N. Hunter; Blake, Cassels & Graydon LLP

(57) ABSTRACT

A master brake cylinder includes a unique mounting arrangement for securing thereof to a firewall of a vehicle and a particular porting arrangement. A cylinder sleeve includes a series of ports that cooperate with movement of the piston allowing for by-passing of the piston at one end position and then movement of the piston past the ports for brake actuation. Additionally a two stage pressure intensifier is provided that is in-line between a master brake cylinder and brake pistons. The intensifier also includes a by-pass position at one end of the movable piston having a differential area between a forward and a rear face of the piston.

6 Claims, 11 Drawing Sheets

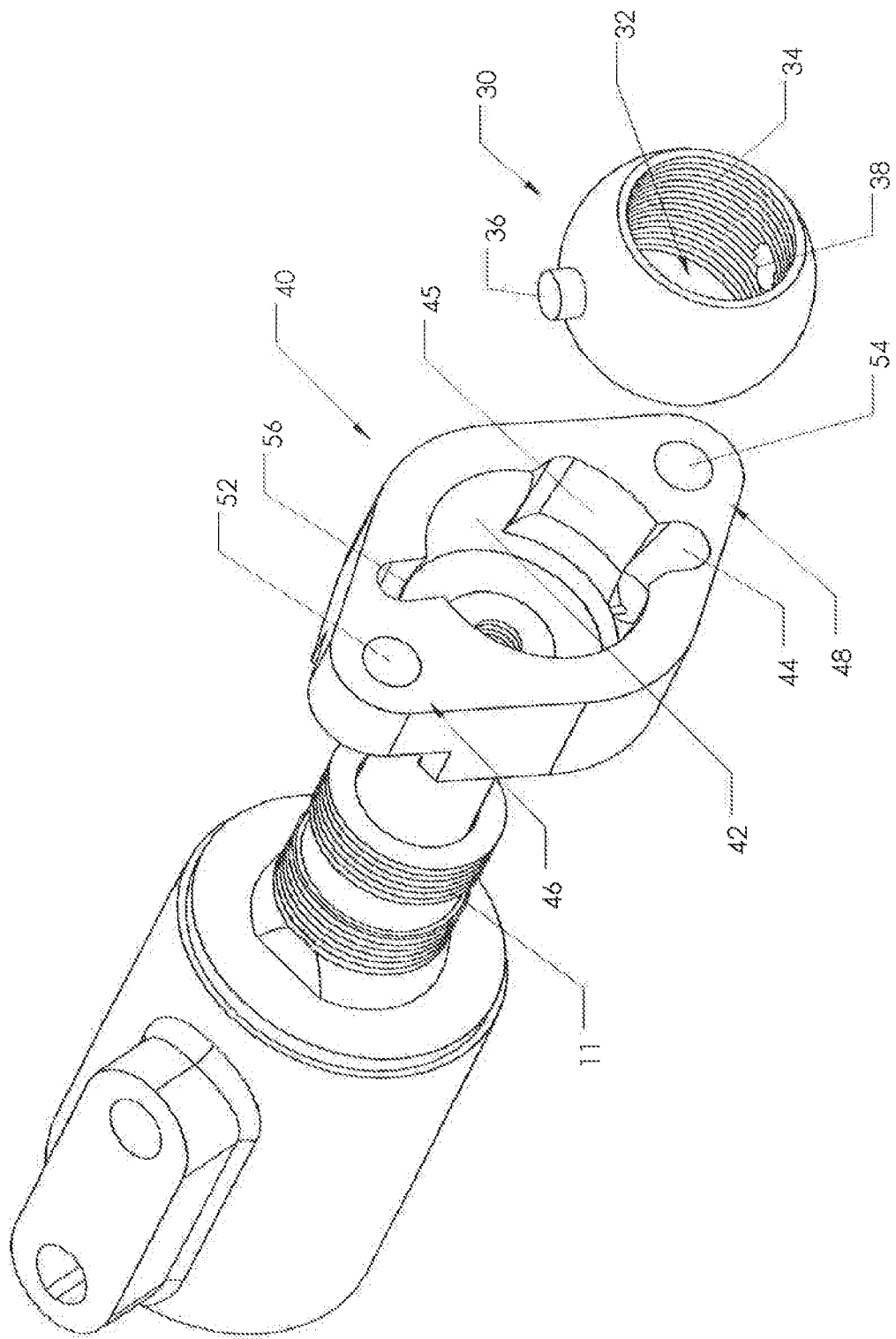

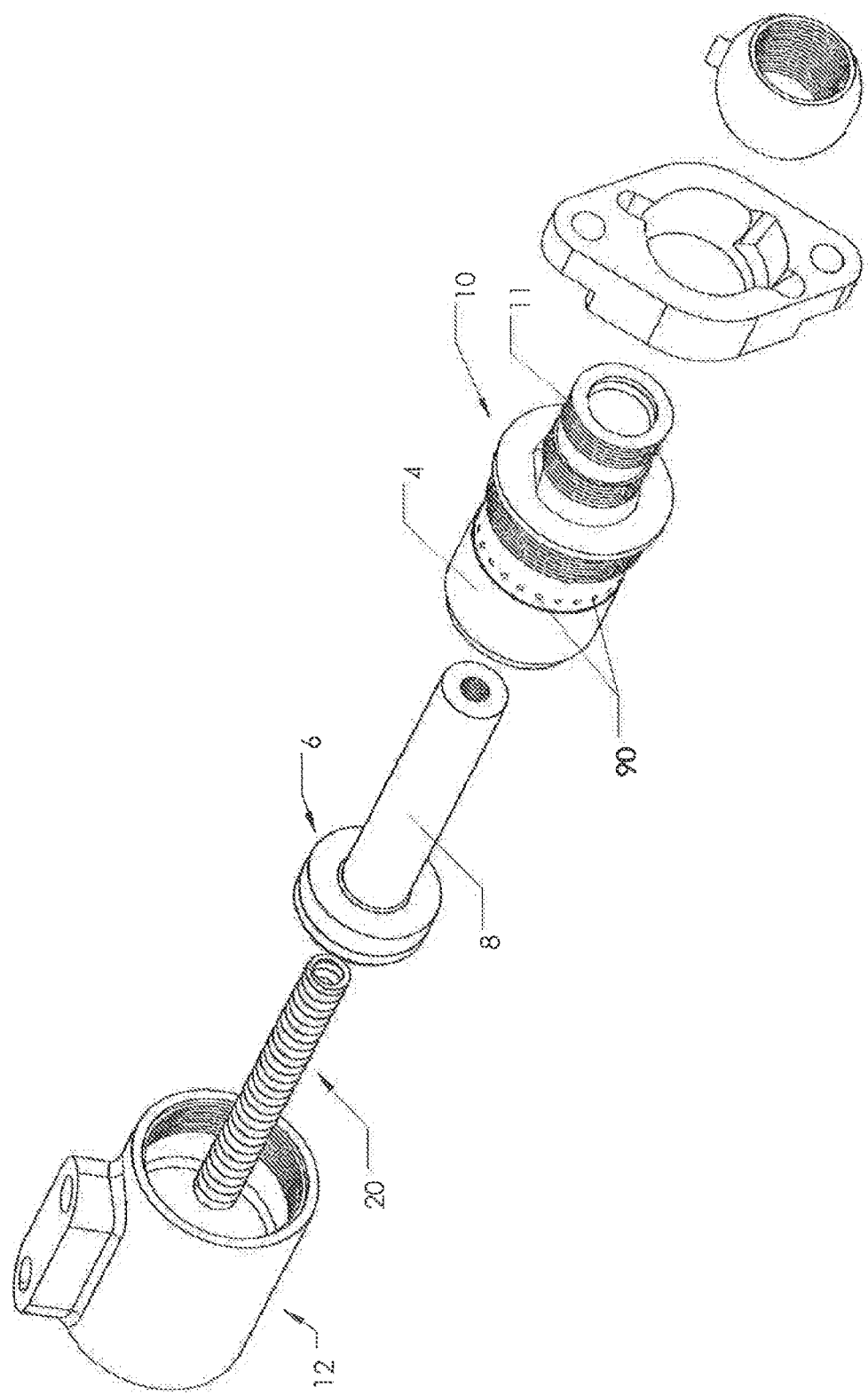

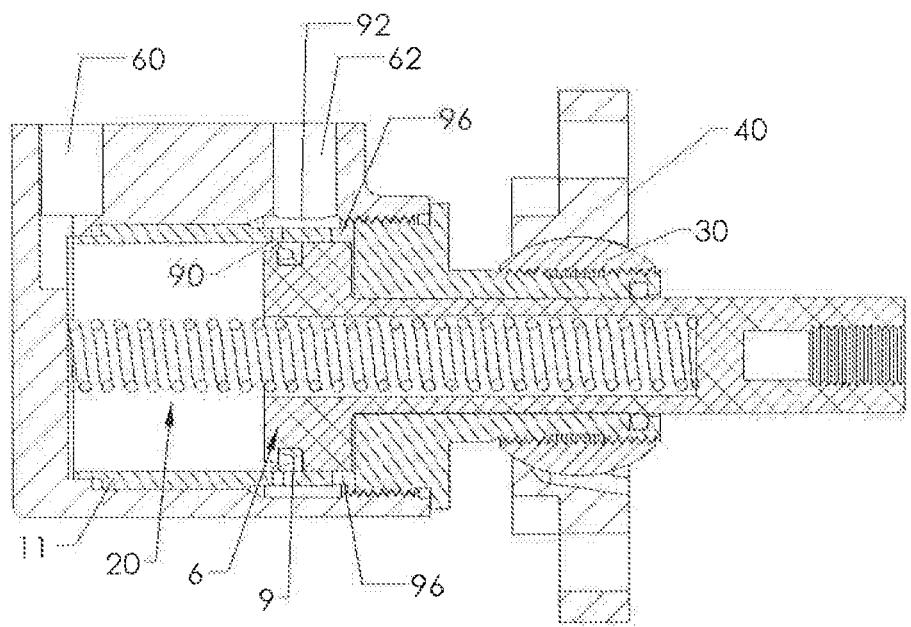
Fig 5 (released position)
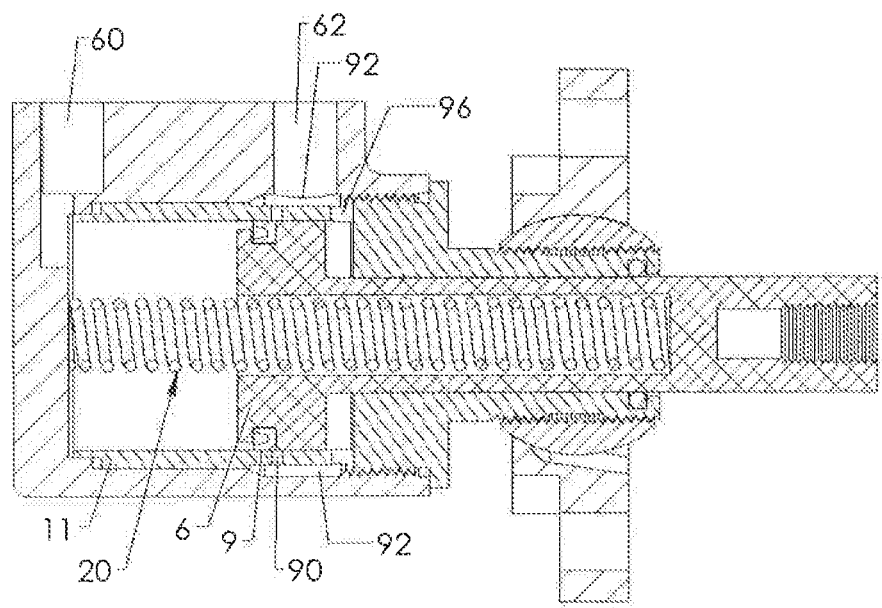
Fig 6 (applied position)

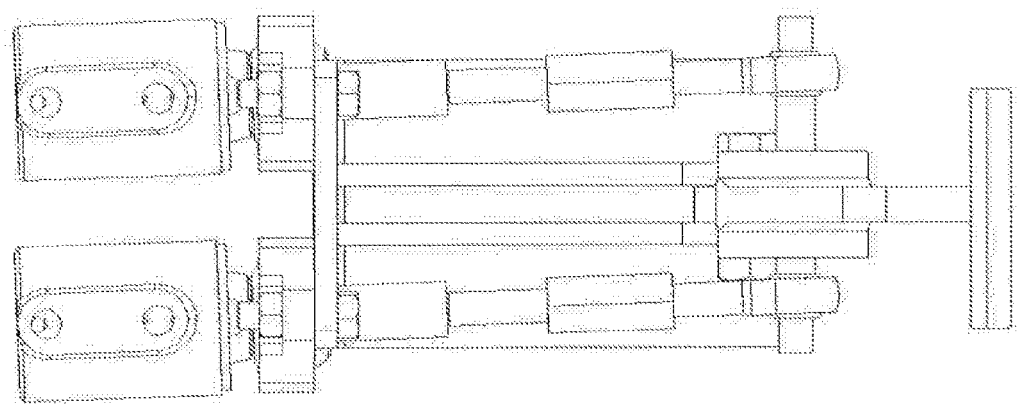
Fig 15 (biased)
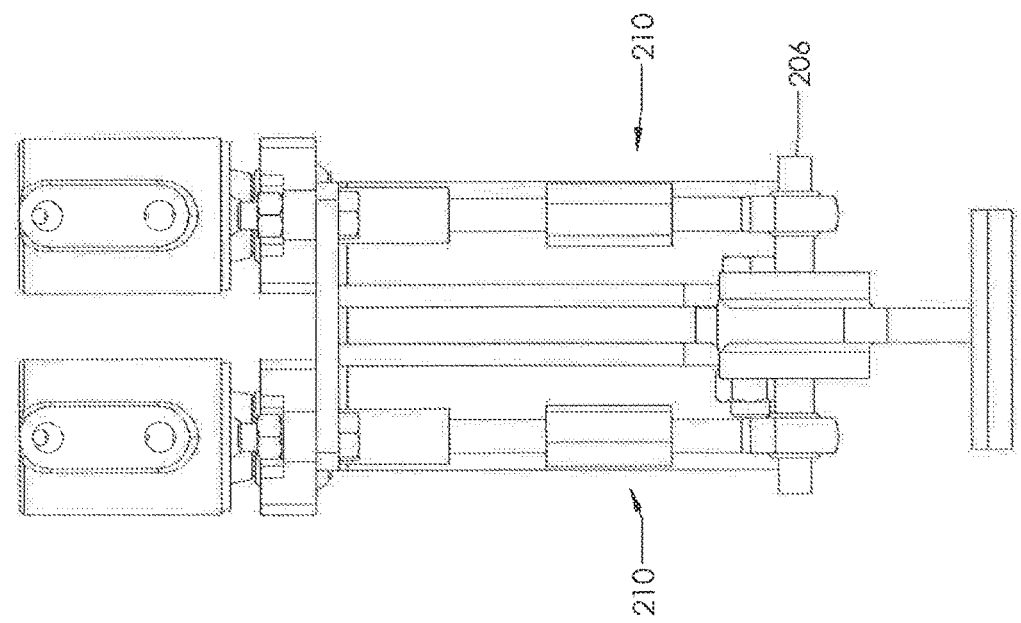
Fig 14 (no bias)

MASTER BRAKE CYLINDER

CROSS-REFERENCE TO RELATED APPLICATIONS

This application claims priority from Canadian Application No. 3,040,995 filed on Apr. 24, 2019 incorporated herein by reference in its entirety.

FIELD OF THE INVENTION

The present invention relates to vehicle braking systems, master brake cylinders and pressure modulating units used in these systems.

BACKGROUND OF THE INVENTION

Master brake cylinders are normally mounted to the firewall of a vehicle and include a push rod that typically has a pivoting ball member at one end of thereof to accommodate changes in the angle of the push rod relative to the longitudinal axis of the brake cylinder. The pivoting movement of the push rod is a function of the non-linear movement of the connected brake pedal and the particular linkage connected to the push rod. With this arrangement, movement of the brake pedal and the corresponding movement of the piston in the brake cylinder is not equal.

It is desirable to include a mounting flange of the master brake cylinder directly secured to the firewall of the vehicle as the mounting flange can include a center section through which the push rod extends with the master brake cylinder effectively closing the port through the firewall.

Prior art master brake cylinder mounting arrangement essentially fix the orientation of the master brake cylinder relative to the firewall. Any necessary movement of the push rod relative to the axis of the cylinder is accomplished by pivot connection of the push rod to the piston or to a member directly connected to the piston. The necessary angular movement of the push rod impacts the braking function.

The present invention includes a mounting arrangement for the master brake cylinder that uses a piston with a fixed push rod. With this arrangement, the master cylinder pivots relative to the firewall to accommodate different angular positions as required due to movement of the brake pedal.

With this mounting and master brake cylinder arrangement, a secure connection of the mounting bracket to the firewall is achieved that isolates the port in the firewall from the engine compartment. Furthermore, the master brake cylinder is relatively compact and does not require excessive room in the engine compartment.

SUMMARY OF THE INVENTION

The present invention relates to a master brake cylinder comprising, a cylinder, a spring biased piston movable in the cylinder to pressurize the brake fluid in one direction of movement of the piston and to remove brake fluid pressure when the piston is moved in an opposite direction. The piston includes a push rod generally fixed to one side of the piston and extending out of the cylinder and a bushing closes one end of the cylinder and has the push rod extend through the bushing. The bushing includes an extending segment having an exposed threaded exterior surface that receives and cooperates with a ball member threaded on the extension. A mounting bracket is located on the push rod between the threaded bushing and the ball member. The mounting bracket has a ball socket sized to receive and pivotally retain the ball member. The mounting bracket further includes a mounting arrangement for fixedly securing the mounting bracket to a firewall of a vehicle. The firewall includes a port allowing the push rod to extend through the firewall with the mounting bracket secured to the firewall.

According to an aspect of the invention, the push rod and the piston are of a one piece construction with the push rod sliding through an elongate bearing portion of the threaded bushing.

In a further aspect of the invention, the cylinder and push rod are pivotly movable relative to the mounting bracket through an angle of at least 15 degrees.

BRIEF DESCRIPTION OF THE DRAWINGS

Preferred embodiments of the invention are shown in the drawings, wherein:

FIG. 3 is a perspective view of the master brake cylinder with the mounting components of the master brake cylinder shown in unassembled rotation;

FIG. 4 is an exploded perspective view of the individual components of the master brake cylinder;

FIG. 5 is a sectional view through the master brake cylinder showing the piston in a released position;

FIG. 6 is a view similar to FIG. 5 with the piston shown in an applied position;

FIG. 14 is a top view of the brake pedal arrangement of FIG. 13 arranged such that the cylinders are in no bias configuration;

FIG. 15 is a view similar to FIG. 14 with the brake arrangement shown in a biased position whereby one of the master brake cylinders operates at a higher pressure relative to the other master brake cylinder;

DETAILED DESCRIPTION OF THE PREFERRED EMBODIMENTS

Figure 1:
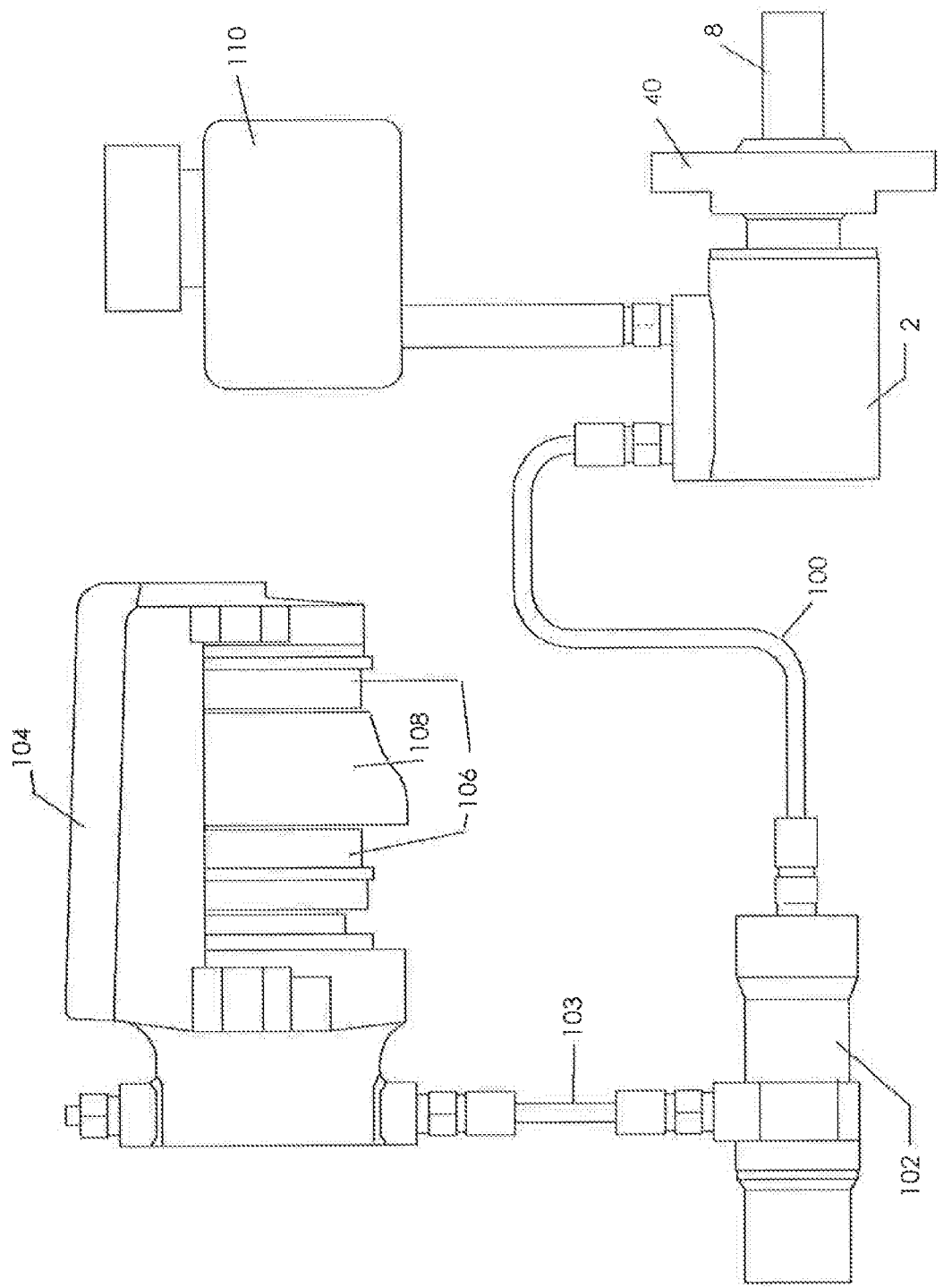
FIG. 1 is a schematic of the master brake cylinder as used in association with an intensifier and a disc brake.

A braking system, as shown in FIG. 1, includes a master brake cylinder 2 connected to a pressure out line 100 that is connected to the intensifier 102. The intensifier 102 selectively increases the pressure provided to the caliper 104 through the outlet line 103. The caliper 104 has a brake cylinder which causes the brake pads 106 to engage the brake disc 108.

The brake system also includes the brake fluid reservoir 110 that is connected to an inlet of the master brake cylinder 2. The brakes are actuated when the push rod 8 moves the piston 6 within the master brake cylinder 2. A mounting bracket 40 secures the master brake cylinder to a firewall of a vehicle. FIGS. 5 and 6 are cross-sections through the master brake cylinder 2 with FIG. 5 showing the piston 6 in a released position and FIG. 6 showing the piston 6 in an applied position. The make-up port 62 is connected to the brake fluid supply 110 and brake fluid is free to pass into the port 62. With the piston 6 in the retracted position of FIG. 5, brake fluid in port 62 can pass through the surrounding cavity 92 to the ring cavity 96 and the rear face of the piston 6. Fluid in port 62 is also in communication with the forward face of the piston 6 through any of the series of ports 90 provided in the cylinder sleeve 4. It can be seen that the piston seal 9 has cleared the ports 90 in FIG. 5, whereas in FIG. 6, the movement of the piston 6 has now located the seal 9 of the piston in front of the ports 90. Movement of the piston 6 towards the pressurized outlet 60 causes movement of the pressurized brake fluid and actuation of the brake pads.

In FIG. 4, it can be seen that the bushing 10 and the cylinder sleeve 11 have been made as a single component to simplify the construction of the master brake cylinder. The biased spring 20 is maintained in a center hollow cavity of the push rod 8 that is a single piece with the piston 6. The cylinder body 12 includes some machining on the interior thereof to define the cavity 92 at the one end of the cylinder.

Figure 7:
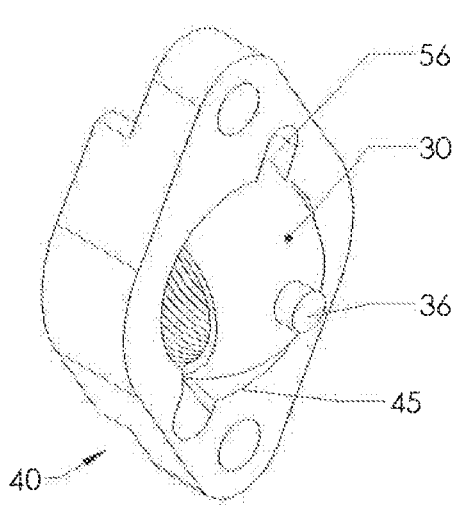
FIGS. 7 through 11 are perspective views of a mounting ball and mounting bracket of the master brake cylinder illustrating the assembly of the mounting ball to the mounting bracket.

Details of the particular mounting of the pivot ball 30, in the mounting bracket 40, is illustrated in FIGS. 7 through 11. The pivot ball 30, as shown in FIG. 7, is orientated such that the center cavity of the pivot ball is extending across the mounting bracket. This provides a fairly narrow profile that allows the pivot ball to be inserted into the cavity of the mounting bracket (as shown in FIG. 7). The loading slot 45, provided on one side of the cavity of the mounting bracket, allows the ball to be inserted.

Figure 2:
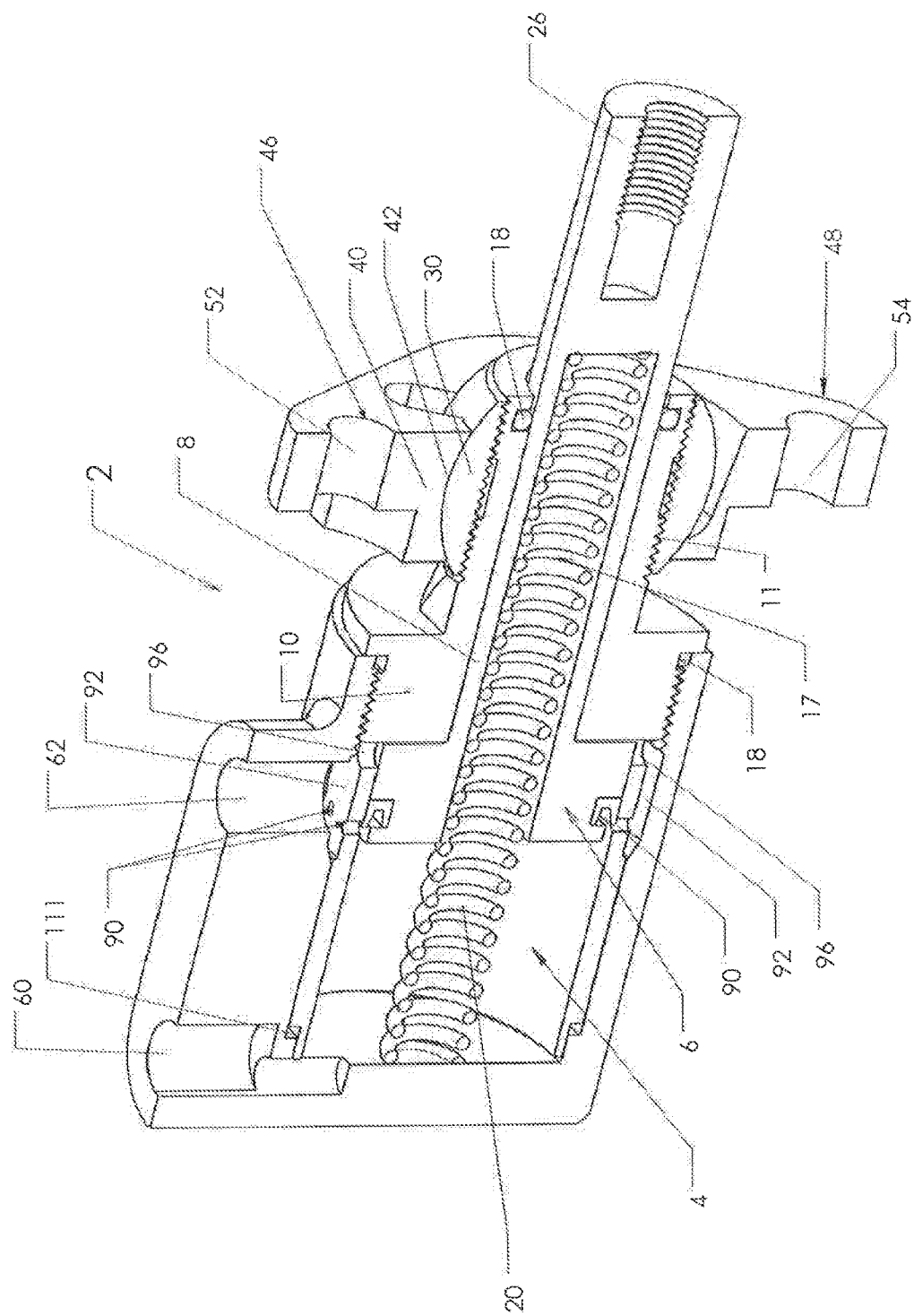
FIG. 2 is a sectional view through the master brake cylinder.

The master brake cylinder 2, as shown in FIGS. 2, 3 and 4, includes a cylinder body 12 that houses the piston 6 with the piston being movable within the cylinder sleeve 4. The cylinder sleeve 4 is preferably a one piece assembly with the bushing 10 and the extension 11. These components are secured by threads provided on the bushing 10 engaging threads of the cylinder body 12.

The cylinder body 12, at one end, includes the threaded port 9 that is closed by the threaded bushing 10. The push rod 8 is preferably of a one piece construction with the piston 6 and extends outwardly through the threaded bushing 10 and the push rod 8 is slidable in the bushing to allow movement of the piston. A ring seal 18 is provided in the threaded bushing 10 that effectively seals the push rod 8 and the threaded bushing 10 closing the cylinder. Securement of the bushing 10 also captures the piston 6 in the cylinder sleeve 4 of the cylinder body 12.

The cylinder sleeve 4 includes a series of ports 90 that allow even a large flow of brake fluid to quickly pass therethrough and connect with the cylinder body cavity 92 that surrounds the cylinder sleeve and is connected to the make-up port 62 of the brake fluid supply 110.

The series of ports 90 and the connection with port 62 provides an effective connection. The piston 10 and the seal 9, when moved past ports 90, actuate the master brake cylinder quickly. Initial actuation of the piston 6 moves piston 6 past the ports 92 allowing further pressurizing of the brake fluid in front of face 7 of the piston 6. Brake fluid behind the piston 6 freely flows between fluid supply 110 as required through the ring gap 96. In the released position of piston 6, shown in FIG. 2 and FIG. 5, the fluid supply 110 is connected to the cylinder in front of the forward face 7 of the piston. The rear face 7 of the piston 6 is always connected to the brake fluid supply 110.

Preferably, the bushing 10 includes an extension 11 that acts as an elongate bearing of the push rod. A bias spring 20 urges piston 6 against bushing 10 at one end of the cylinder body 12. Preferably, spring 20 extends through the piston 6 and occupies part of a hollow cavity 17 in a longitudinal axis of the push rod 8. The free end 26 of the push rod 8 is threaded for connection to a link member of the brake pedal of a vehicle.

A mounting bracket 40 is provided between the threaded bushing 10 and the pivot ball 30. The pivot ball 30 includes a center port 32 that includes threads 34 for engaging the exterior threads 11 provided on the threaded bushing.

The mounting bracket 40 includes the ball socket 42 for receiving and rotatably cooperating with the pivot ball 30. The mounting bracket 40 allows pivoting of the pivot ball 30 in the mount bracket and movement of the cylinder body 12. The pivot ball is fixedly secured to threads 11 of the threaded bushing 10.

The mounting bracket includes two mounting flanges 46 and 48 on opposite sides of the bracket with these mounting flanges including, respectively, mounting ports 52 and 54 for securing of the mounting bracket to the firewall of a vehicle. The firewall of the vehicle includes a port through the firewall with the push rod 26 aligned with and preferably extending through the port. With this arrangement, the mounting bracket 40, when secured to a firewall, effectively captures the pivot ball 30 between the firewall and the ball socket 42. The master brake cylinder 2, includes a fluid outlet port 60 for receiving pressurized fluid provided to one or more brake cylinders as well as a supply port 62 provided to the opposite side of the piston 6. Movement of the piston to the left from released position of FIG. 2, closes the area in front of the piston from the supply port 62 and allows pressurizing of the brake fluid.

The cylinder body 12 is closed at the end adjacent the port 60 that is connected to one or more brake cylinders.

Additional details of the pivot ball 30 and the mounting bracket 40 are shown in FIGS. 4, 5 and 6. The pivot ball 30 includes a projecting fixed pin 36 with a set screw 38 provided on an opposite side of the pivot ball. The set screw 38 is used to lock the pivot ball in a particular position on the elongate extension 11 of the threaded bushing 10.

The mounting bracket 40 includes an axis slot 44 that allows a tool to engage and tighten the set screw 38 and effectively fix the pivot ball 30 on the threads 30 of the extension 11 of threaded bushing 10. The axis slot 40 also includes a shallow loading slot 45 that allows the pivot ball 30 to enter the socket cavity 42. The fixed pin 36, to the opposite side of the pivot ball 30, is received in slot 56 in the rear face of the mounting bracket. The pin 36 allows the pivot ball 30 to pivot in the mounting bracket 40. In this way, the mounting bracket 40 is maintained on the pivot ball 30 in a desired position and the pivot ball 30 is fixedly secured to the threaded portion of the threaded bushing 10. The push rod 8 extends through the threaded bushing and through the mounting bracket 40. The loading slot 45 provides sufficient clearance to allow the pivot ball 30 to enter the recessed cavity defining the ball socket 42. Once located in this ball socket 42, the pivot ball 30 can be fixed on the threaded portion of the threaded bushing. The securement of the pivot ball 30 in the ball socket 42 allows pivoting of the cylinder body 12, the piston 6 and the push rod 8 to one side of the firewall. The push rod extends through a port in the firewall and allows changes in the angular position of the cylinder 4, as required to accommodate movement of the brake pedal and actuation of the brake.

An assembled version of the ball in the mounting bracket is shown in the partial sectional view through the pivot ball 30 in FIG. 5.

Figure 8:
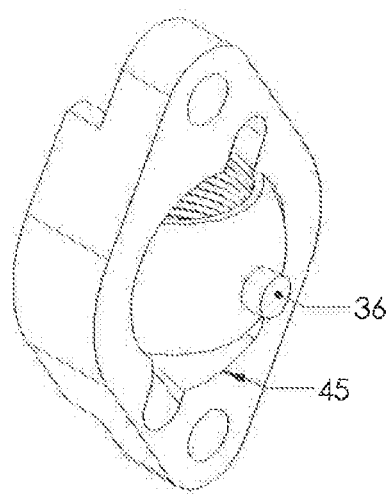
Figure 9:
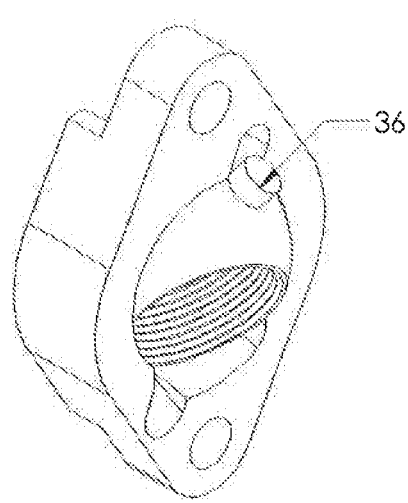

With the ball inserted in the mounting bracket 40, as shown in FIG. 7, it is then possible to rotate the pivot ball to the position shown in FIG. 8. With this rotation, it can now be appreciated that the pivot ball 30 is captured within the ball socket 42.

Figure 10:
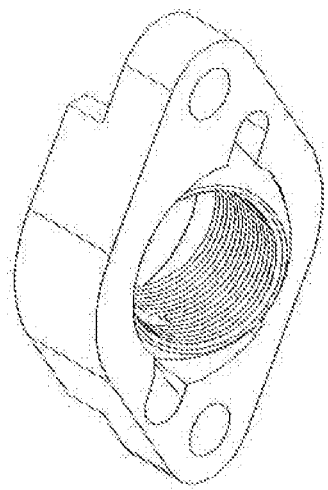
Figure 11:
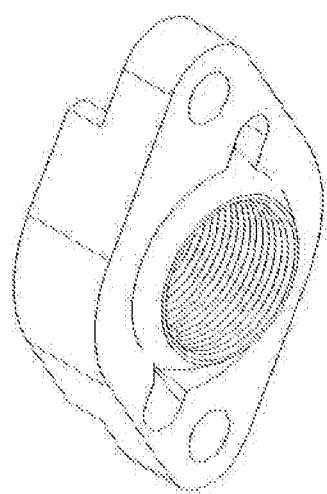

Once in the position shown in FIG. 8, the pivot ball can then be rotated to position the fixed pin 36 in the slot 56. With the pivot ball positioned within the mounting bracket 40, as shown in FIGS. 10 and 11, the pivot pin 36 can move forward and back in the slot 56 and the pivot ball can also rotate about the pivot pin 36, as shown in FIG. 10. Once the pivot ball has been secured in the mounting bracket 40, as shown in FIG. 11, it can then be threaded on the bushing 10. A set screw 38, in the pivot ball 30, can then be tightened to fix the pivot ball in a desired position on the threaded bushing. The set screw can be appropriately tightened by moving the mounting bracket 40 relative to the pivot ball to allow access to the set screw through the axis slot 44.

Figures 12, 13:
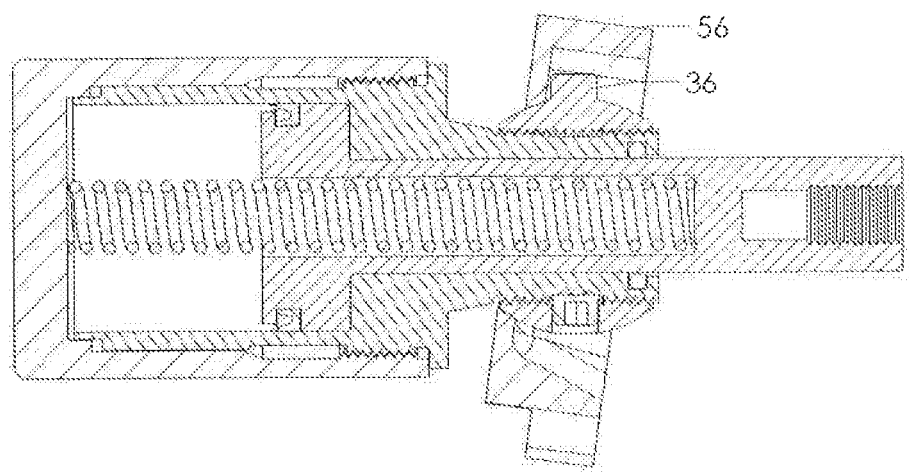
FIG. 12 is a sectional view through the master brake cylinder showing how the mounting bracket can be at an angle to the piston rod and brake cylinder.
FIG. 13 is a perspective view of a brake pedal mounting arrangement showing a pair of master brake cylinders.

FIG. 12 shows a cross-section through the master brake cylinder with the mounting bracket 40 rotated on the pivot ball to allow for angulation of the master brake cylinder. It can be seen that the pivot pin 36 is at one end of the loading slot 56.

As previously indicated, one of the advantages of the present invention is the particular mounting arrangement defined by the mounting bracket 40 in the pivot ball 30. The mounting bracket is movable on the pivot ball and the push rod 8 extends outwardly through the pivot ball and the mounting bracket. This push rod 8 is shown in FIG. 13 connected to a brake pedal arrangement 200. The brake pedal 202 is pivotally mounted at 204 and a bias rod 206 is secured to the brake pedal 202 and moves about the pivot axis 204 with movement of the brake pedal. The push rods 8 are connected by a linkage 210 to the bias rod 206. Due to the movement of the linkage 210 and the rotation of the brake pedal 202, the brake cylinders 2 will rotate or change the angle relative to the mounting brackets 40 which are fixed to a firewall. The two master brake cylinders, shown in FIG. 13 and the brake pedal arrangement 200, is similar to the braking system used in many racing cars.

In FIG. 14, it can be seen that the two linkages 210 connected to each of the master brake cylinders are equally spaced on the bias rod 206 that pivots at its mount to the brake pedal. With the arrangement as shown in FIG. 14, the push rods of both of the master cylinders will move in the same manner and the bias rod is balanced (same force either side of the bias rod 206).

A biased arrangement is shown in FIG. 15 where one of the brake cylinders (short end of the bias rod) will operate at a higher pressure as a function of the differential levers caused by shifting the bias rod. This arrangement is helpful in that one of the master cylinders may control the front brakes and the other master cylinder controls the rear brakes. The position of the bias rod has changed and, thus, the operating pressure of each of the master brake cylinders has been changed. This allows a convenient set up while both of the master cylinders remain attached to the firewall of the vehicle and the master brake cylinders undergo any necessary rotation about the pivot ball during actuation of the brake. With this arrangement, the pivoting of the master cylinder occurs at the firewall and a secure mounting of the master brake cylinder to the firewall is provided by the mounting bracket 40 and the pivot ball 30. Although not shown, a plate can be secured to the mounting bracket that partially encloses the pivot ball in the mounting bracket.

With this arrangement, limited pivoting movement of the master brake cylinder is accommodated to one side of the firewall while using a compact piston and push rod arrangement. A pivoting push rod and piston arrangement, is not required as the cylinder housing is allowed to pivot relative to the mounting bracket 40. The one or more brake lines associated with the outlet port 62 are of a construction to accommodate the required limited pivoting movement. The amount of angular movement of the cylinder is approximately 15 degrees. With this arrangement, movement of the brake pedal is closely associated with the actual movement of the piston and the linkage connecting the brake pad to the piston is simplified.

Figure 16:
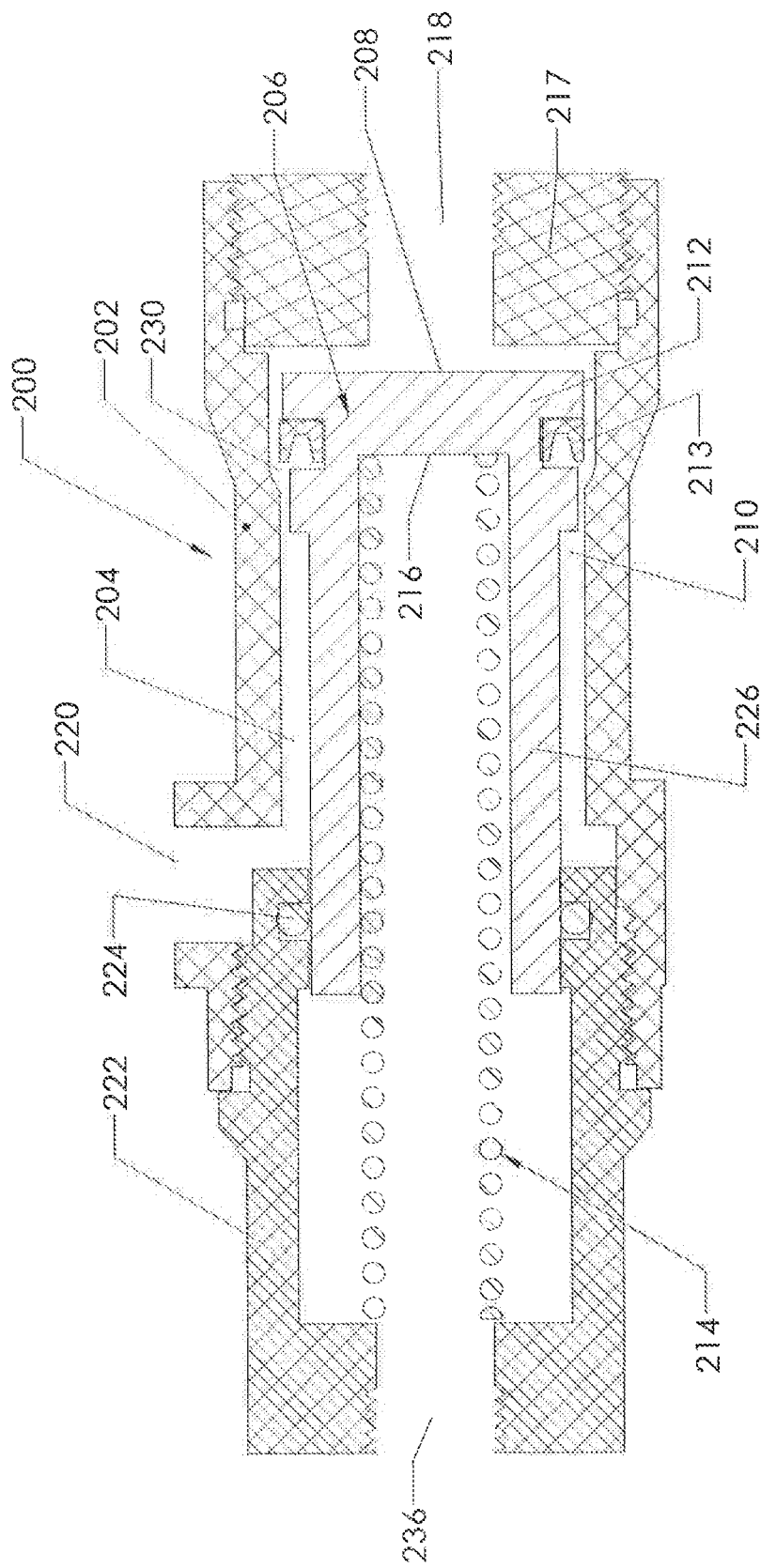
FIG. 16 is a sectional view of the pressure intensifier in a bypass position.
Figure 17:
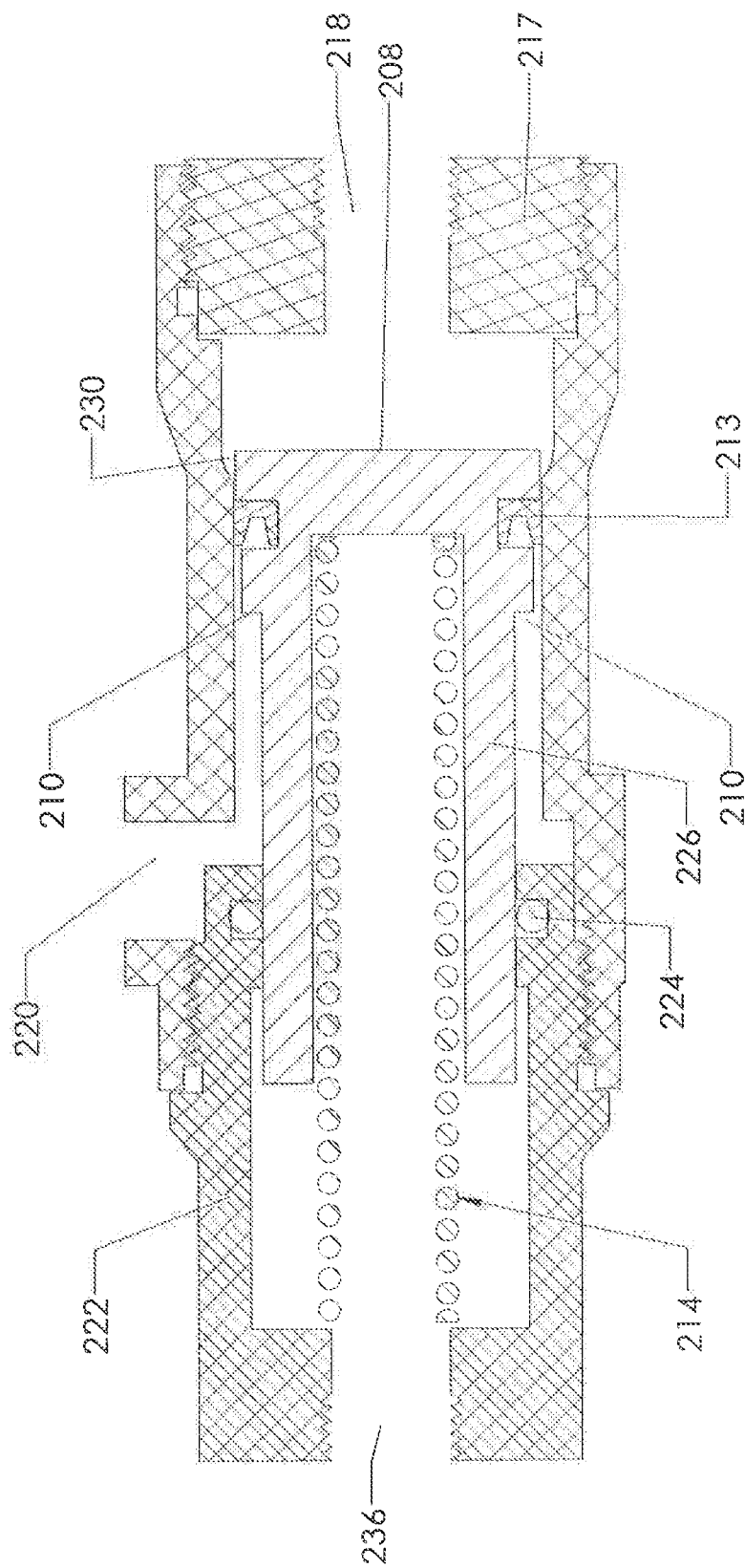
FIG. 17 is a sectional view of the pressure intensifier in an actuating position.
Figure 18:
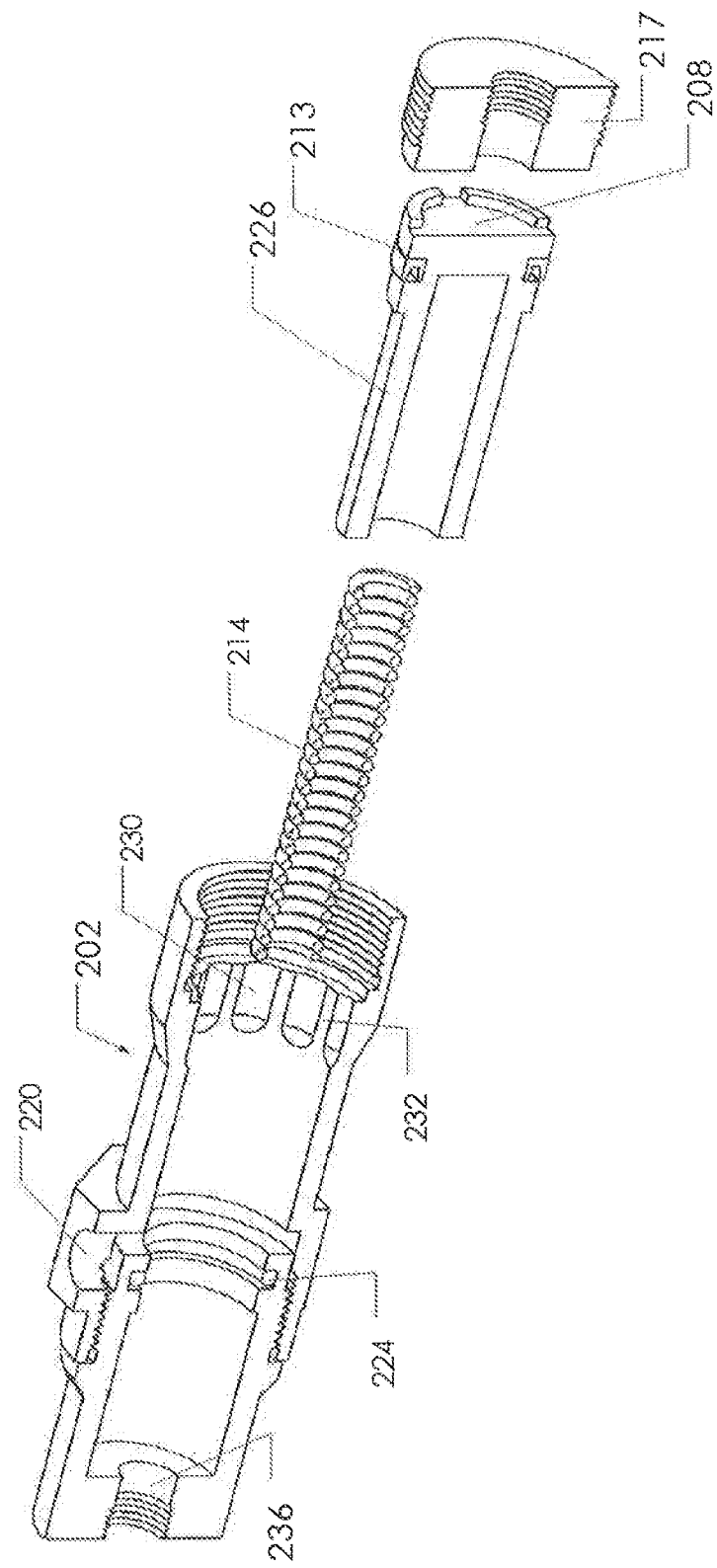
FIG. 18 is an exploded perspective sectional view of the components of the pressure intensifier.

FIGS. 16, 17 and 18 provide details of the two-stage intensifier 200. This intensifier is positioned between the master cylinder and the brake caliper. The purpose of the two-stage intensifier is to, initially, function in a bypass mode such that the intensifier is essentially neutral to the entire system. The intensifier can be set to start acting when the pressure at the outlet of the master brake cylinder exceeds a particular pressure.

The two-stage intensifier 200, as shown in FIG. 16, includes an intensifier body 202 that receives the piston 206. Piston 206 includes a large pressure face 208 facing the master cylinder and communicating therewith through the inlet port 218. The body housing 202, is closed at the right hand side by the plug 272 having the inlet port 218. The piston head 212 includes the cup seal 213 that cooperates with the cylinder cavity 204.

In the position shown in FIG. 16, the piston 206 is biased by the spring 214 acting on the rear face 216 of the piston head 212. It is desirable that this spring force is adjustable or at least the value of the spring force can change depending upon the particular application. Movement of the piston head 212 to the left requires compression of the bias spring 214.

Initial pressure from the master cylinder is communicated to the large pressure face 208 of the piston head 212. As can be seen, the brake fluid is free to move to the edges of the piston and flow through the bypass flutes 230 and into the cylinder cavity 204. In the bypass position, the outlet port 220 is in fluid communication with the calipers as well as the master brake cylinder. The intensifier is in a bypass mode allowing brake fluid to flow around the piston head. Any fluid pressure from the master cylinder will act on the forward face 208 urging the piston to move to the left. In the bypass position, this same pressure acts on the smaller rear pressure face 210 of the piston head urging the piston to move towards the right. Therefore, the pressure on the smaller pressure face 210 creates a force urging the piston towards the right and the bias spring 214 urges the piston to the right. Pressure from the master cylinder on the forward face 208 creates a force urging the piston head 212 to the left.

The above analysis is simplified for the purpose of understanding the bypass structure in combination with the large forward pressure face and the smaller rear pressure face. When the brakes are applied, the intensifier is active and the pressure to the calipers is increased as a function of the difference in area of the pressure faces.

In a preferred structure, the large forward face has an area of 0.6 square inches and the smaller rear face has an area of 0.4 square inches. At 50 psi, produced by master brake cylinder, the force on the piston urging it to the left is approximately 30 lbs. and the pressure force urging the piston to the right is approximately 20 lbs. The spring force can be set to compensate for the difference.

When the pressure from the master cylinder exceeds this balance pressure, the piston will move to the left, as shown in FIG. 17, such that the piston head 212 has moved past the bypass flutes 230 effectively sealing the inlet port 218 from the cylinder chamber 228. For the piston to be balanced, the pressure in the chamber 228 and, thus, the pressure to the calipers must exceed the pressure exerted by the master cylinder.

For the system to work, it can be seen that the piston 206 includes a piston extension stem 226 that moves through the plug 222 which closes the chamber 228. A seal 224 acts on the outer surface of the piston extension stem 226 such that the chamber 228 is closed with the only outlet being through the outlet port 220. The plug 222 does include an outlet port 236, however, this is essentially at an atmosphere pressure and/or could be connected to the brake fluid supply. This outlet port is not connected to the smaller rear pressure face.

The present intensifier, as shown in FIGS. 16 through 18, is relatively simple to manufacture and is placed in line with the master cylinder to connect the master cylinder to the brake calipers or caliper. The intensifier has a first stage where it is essentially neutral to the system and allows fluid from the master cylinder to be in fluid communication with the brake fluid of the brake calipers. At minimum or low pressures, the fluid is bypassed around the piston head due to the bypass flutes 230 provided in the body housing 202 of the intensifier. At a higher pressure from the master cylinder, the piston moves to the left and the piston head 212 and, in particular, the cup seal 213, now seal with the cylinder cavity 204 such that the fluid from the master cylinder is essentially isolated from the fluid to the calipers. Due to the differential areas of the piston head 212, the pressure provided to the calipers or exerted on the calipers, is higher than the pressure exerted by the master cylinder as this is a function of the forward face and rear face of the piston head.

When the brake pedal is released, the pressure from the master cylinder is reduced and the higher pressure from the calipers moves the piston to the right and allows venting of this high pressure, particularly, once the piston head clears the position where the bypass flutes become active.

It has been found that this intensifier has a smooth transition between bypassing and the higher pressure once it has been activated. Through this transition point, there will be some leakage through the flutes and, therefore, there is a transition region rather than a hard on/off actuation point. This is desirable as the driver receives feedback and is better able to control actuation of the brakes.

The intensifier is particularly useful in older model cars where power brakes are not available or not allowed for the particular car or race. The intensifier can work with conventional master brake cylinders and provide improved performance and more consistent or recognizable braking through the transition point.

In braking systems, the intensifier can be used to change pressures provided to front and rear brakes and/or right to left brakes. For example, an intensifier could be used to increase pressure to front brakes by providing an intensifier in the rear brake lines by providing an intensifier in that line without an intensifier in the rear brake lines or the use of two different intensifiers.

Intensifiers can be use with separate master brake cylinders and/or a single master brake cylinder to provide a desired pressure differential in hydraulic brake lines.

Although preferred embodiments of the present invention have been described herein in detail, it will be appreciated by those skilled in the art that variations may be made thereto without departing from the scope of the appended claims.

The embodiments of the invention in which an exclusive property or privilege is claimed are defined as follows:

1. A master brake cylinder comprising:
    a spring biased piston movable in a cylinder to pressurize a brake fluid in one direction of movement and to remove brake fluid pressure when moved in a direction opposite to said one direction;
    said piston including a push rod fixed to one side of said piston and extending out of said cylinder and through a bushing closing one end of said cylinder;
    said bushing including an extension with an exposed threaded exterior surface that receives and cooperates with a ball member threadingly secured thereto;
    said ball member having a pivot pin extending outwardly from an outer surface of said ball member; and
    a mounting bracket located on said push rod between said threaded bushing and said ball member;
    said mounting bracket having a ball socket opening towards said ball member and sized to receive and pivotally retain said ball member and a receiving slot sized to receive said pivot pin on said ball member;
    said mounting bracket further including a mounting arrangement for fixedly securing said mounting bracket to a firewall of a vehicle to retain said ball member between said mounting bracket and the firewall of the vehicle;
    the firewall of the vehicle being provided with a port allowing said push rod to extend through said firewall.

2. A master brake cylinder as claimed in claim 1 wherein said push rod and said piston are of a one piece construction with said push rod sliding through an elongate bearing portion of said threaded bushing.

3. A master brake cylinder as claimed in claim 1 wherein said cylinder and said push rod are pivotally movable relative to said mounting bracket through an angle of at least 15 degrees.

4. A master brake cylinder as claimed in claim 1 wherein said cylinder includes a cylinder body and a cylinder sleeve sized for insertion in said cylinder body;
    said cylinder sleeve, at one end thereof, including a series of ports passing through and about a circumference of said cylinder sleeve and communicating with a brake fluid supply source;
    said piston being located to one side of said series of ports in a released position of said master brake cylinder and movable to a brake actuating position on an opposite side of said series of ports.

5. A master brake cylinder as claimed in claim 1 in combination with a two stage pressure intensifier.

6. A master brake cylinder as claimed in claim 5 wherein said two stage pressure intensifier includes a series of flute ports that cooperate with a piston of the intensifier in a bypass position to bypass brake fluid to the outside of the piston and movable by pressure to a pressure boosting position with said piston having moved past said flute ports.

* * * * *